June 9, 1931. A. J. GIFFORD ET AL 1,808,845
COOLING DEVICE FOR MOTORS
Filed Oct. 8, 1929 2 Sheets-Sheet 1

Inventors
Albert J. Gifford
Benjamin J. T. Bishop

June 9, 1931.  A. J. GIFFORD ET AL  1,808,845
COOLING DEVICE FOR MOTORS
Filed Oct. 8, 1929  2 Sheets-Sheet 2
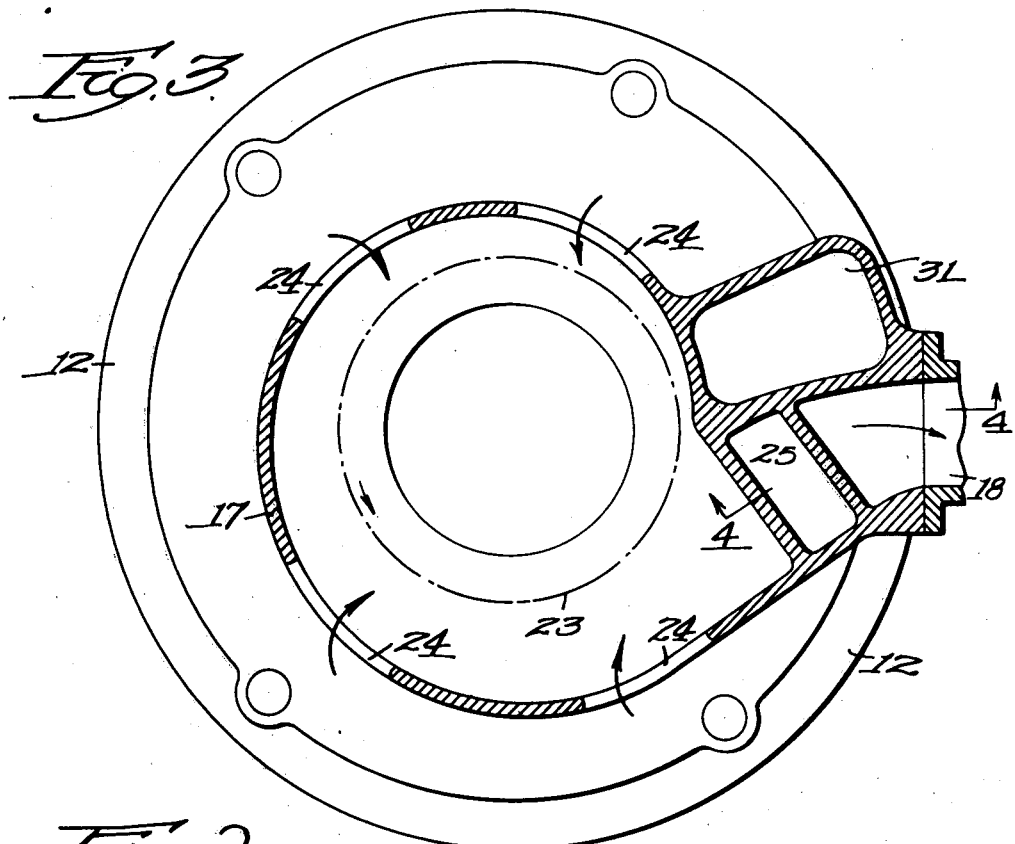
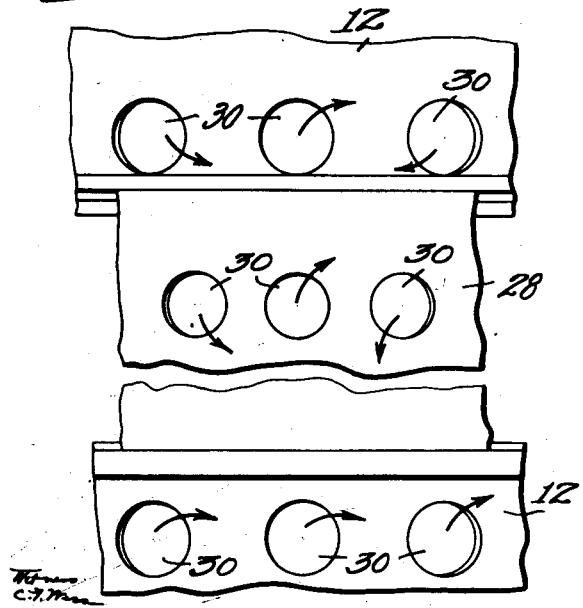
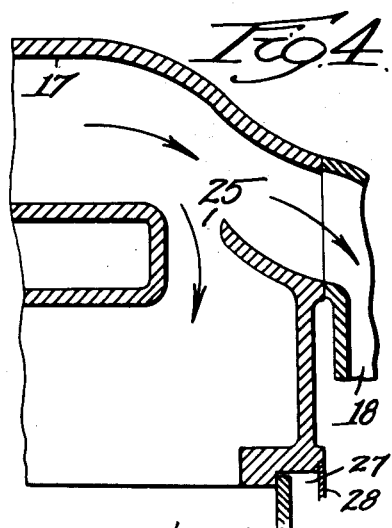
Inventors
Albert J. Gifford
Benjamin S. T. Bishop.

Patented June 9, 1931

1,808,845

UNITED STATES PATENT OFFICE

ALBERT J. GIFFORD AND BENJAMIN S. T. BISHOP, OF SHREWSBURY, MASSACHUSETTS, ASSIGNORS TO LELAND-GIFFORD COMPANY, A CORPORATION OF MASSACHUSETTS

COOLING DEVICE FOR MOTORS

Application filed October 8, 1929. Serial No. 398,207.

This invention relates to the cooling of motors, particularly those used on machine tools, such as drills and the like.

The principal objects of the invention are to provide a separate fan for cooling the motor connected up so that it will not reverse when the motor reverses and to provide means for distributing the currents of air for cooling purposes around the outside surfaces of the stator shell and the exposed part of the stator windings to provide an efficient and rapid cooling.

Other objects and advantages of the invention will appear hereinafter.

Reference is to be had to the accompanying drawings in which

Fig. 2 is a side view of the motor casting, taken in the direction of the arrow 2 in Fig. 1 showing the various outlets;

Fig. 3 is a horizontal sectional view on the line 3—3 of Fig. 2; and

Fig. 4 is a sectional view on the line 4—4 of Fig. 3.

Figure 1:
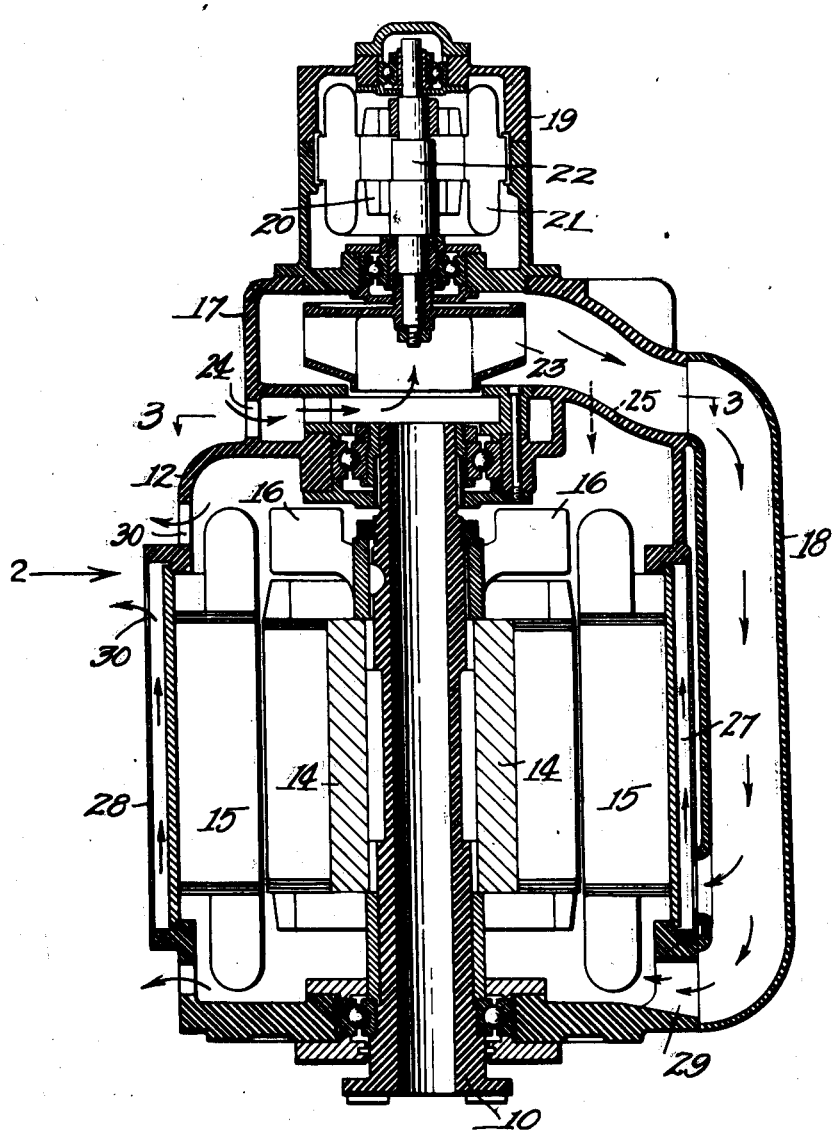
Fig. 1 is a diametrical sectional view of the main motor and fan motor for a motor-driven upright drill constructed in accordance with this invention.

In Fig. 1 is shown the motor connected for driving a drill, the drill not being illustrated except to show the quill 10 which the motor drives.

The motor is located in a casing 12. The quill 10 which drives a spindle 13 is mounted in anti-friction bearings and vertically arranged, of course, in this casing.

The motor for driving the quill is an ordinary motor having a rotor or core 14 and stationary coils 15 arranged outside the same. This motor as produced in the market is provided with a fan 16 rotating with the rotor and of course, rotating in the reverse direction when the machine is reversed. We have shown this fan in position because it is produced with the motor although it is not a feature of this invention and is of small importance in the cooling and can be dispensed with.

On the top of the casing 12 is a casing 17 which conducts air currents and connected with a manifold 18 extending down one side of the motor casing, and has a fan motor casing 19 on its top.

In this casing is a motor which may be made the same as the motor 14—15 and which has two parts 20 and 21, the former being a rotor and being mounted on the fan shaft 22 and is mounted in anti-friction bearings as usual. On the lower end of the fan shaft is a fan 23 within the casing 17. This fan is operated at the desired speed by the motor 20—21 and always in the same direction. The connection of the two motors with the power is so made that when the machine motor is reversed the fan motor will continue to rotate in the proper direction to produce the strongest air currents and in fact, this motor may be so connected up that it is not reversible. The connections for accomplishing these results are not shown herein as they constitute the subject matter of a different invention and it is obvious that the wiring for the two motors can be entirely independent.

The air enters the fan 23 through one or more ports 24, passes through the fan and through the casing 17 and down the manifold 18. A small part of the air passes through openings 25 into the top of the main motor casing 12, but most of it passes through a port 26 into the bottom of an annular air space 27 which surrounds the motor casing 12, this air space being formed by an outside casing 28. The rest of the air passes through port 29 into the bottom of the motor casing and the air passes out through outlets 30.

This causes the air to circulate around the motor casing and through the motor both at the top and bottom. The fan 16 assists circulation when the main motor is running forwardly and retards it a little when running backwardly and can be omitted entirely.

It will be seen by reference to Fig. 3 that the space 31 in which the wires are located for feeding the motors is also cooled pretty well on one side at the top and also that the air has an opportunity to cool the main motor at all points. This furnishes an efficient means for circulating the cooling air at all times whether the motor is running forwardly or backwardly and the air currents are made strong enough by the separate fan so that the rearward rotation of the main motor fan 16, if present, will not seriously affect them.

Although we have illustrated and described only one form of the invention we are aware of the fact that modifications can be made therein by any person skilled in the art without departing from the scope of the invention as expressed in the claims.

Therefore we do not wish to be limited in this respect but what we do claim is:—

1. The combination with a main motor, of a fan motor, a fan on the fan motor shaft, a casing around said fan, means for delivering the air from the fan into the main motor at a plurality of levels, a casing surrounding the main motor and having an annular air space around the stator of the main motor and means for introducing the air currents from the fan into said space and into the space around the exposed parts of the windings of the stator.

2. The combination with a main motor, of a fan motor, a fan on the fan motor shaft, a casing around said fan, means for delivering the air from the fan into contact with the outer surface of the stator of the main motor at a plurality of levels, one at the bottom and one at the top thereof, the main motor having a casing provided with air outlets at top and bottom opposite the inlets from the fan.

In testimony whereof we have hereunto affixed our signatures.

ALBERT J. GIFFORD.
BENJAMIN S. T. BISHOP.